United States Patent
Mills et al.

(10) Patent No.: US 6,780,237 B2
(45) Date of Patent: Aug. 24, 2004

(54) CEMENTITIOUS COMPOSITIONS AND A METHOD OF THEIR USE

(75) Inventors: Peter Shelley Mills, Stamping Ground, KY (US); David Neil Degville, Lexington, KY (US)

(73) Assignee: Fosroc International Limited, Swindon (GB)

( * ) Notice: Subject to any disclaimer, the term of this patent is extended or adjusted under 35 U.S.C. 154(b) by 53 days.

(21) Appl. No.: 10/095,097

(22) Filed: Mar. 12, 2002

(65) Prior Publication Data

US 2002/0157576 A1 Oct. 31, 2002

Related U.S. Application Data

(63) Continuation of application No. PCT/GB00/04016, filed on Oct. 19, 2000.
(60) Provisional application No. 60/192,578, filed on Mar. 28, 2000, and provisional application No. 60/160,163, filed on Oct. 19, 1999.

(51) Int. Cl.$^7$ ............................................. C04B 24/00
(52) U.S. Cl. ...................... 106/724; 106/725; 106/726; 106/733; 106/737; 106/823
(58) Field of Search .............................. 106/724, 725, 106/726, 733, 737, 823

(56) References Cited

U.S. PATENT DOCUMENTS

5,550,281 A    8/1996   Cirjak et al.

FOREIGN PATENT DOCUMENTS

| DE | 25 34 564 A | 2/1977 |
|----|-------------|--------|
| DE | 33 02 440 C | 10/1983 |
| DE | 197 33 854 A | 2/1999 |
| GB | 2 159 512 | 12/1985 |
| WO | WO 98/58886 | 12/1998 |

OTHER PUBLICATIONS

Chemical Abstracts, vol. 104, No. 24, Jun. 16, 1986; Takada et al: "Mortar compositions" abstract & JP 61 040862, Feb. 27, 1986.
Chemical Abstracts, vol. 117, No. 8, Aug. 24, 19962; Sasagawa: "rapid–setting, low–shrinkage mortar compositions", & JP 04 077340 A, Mar. 11, 1992.
Database WIP, Section Ch, Week 198539, Derwent Publications Ltd., London, GB &JP 60 158269, Aug. 19, 1985.

Primary Examiner—Paul Marcantoni
(74) Attorney, Agent, or Firm—Nixon & Vanderhye P.C.

(57) ABSTRACT

A settable composition suitable for coating surfaces; e.g., walls of a mine comprises (i) a cementitious composition comprising the following components: (a) at least 25% preferably at least 40% of a reactive cement having a C to A or (A+X) ratio of greater than 1:1 preferably greater than 1.2:1, where X is S* or S or F (b) from 0 to 10% of lime and (c) from 5 to 70% preferably 10 to 40% of calcium sulphate, and where the sum of (b) and (c) is at least 15% the % being by weight based on the combined weight of (a), (b) and (c) and where the proportions of the components are such that the composition on hydration is capable of absorbing at least its own weight of water and (ii) an aqueous emulsion of an organic polymer, the amount of (ii) in relation to (i) being such as to provide a weight ratio of polymer solids to combined weight of (a), (b) and (c) of from 0.5:1 to 10:1, preferably 0.7:1 to 2:1 or (iii) an organic polymer in the form of a powder dispersible in water and where the amount of organic polymer is such as to give a weight ratio of polymer solids to combined weight of (a), (b) and (c) of from 0.5:1 to 10:1, preferably 0.7:1 to 2:1 and where the proportions of the components are selected from within the above defined ranges to provide a composition which on hydration will have a tensile strength at 4 hours of at least 135 psi and en elongation of 7 days of at least 20%. When the composition contains components (i) and (ii) the amount of water can be equal to at least 50% by weight of the weight cementitious composition (i), preferably from 70% to 250%.

17 Claims, 1 Drawing Sheet

CEMENTITIOUS COMPOSITIONS AND A METHOD OF THEIR USE

Figure 1:
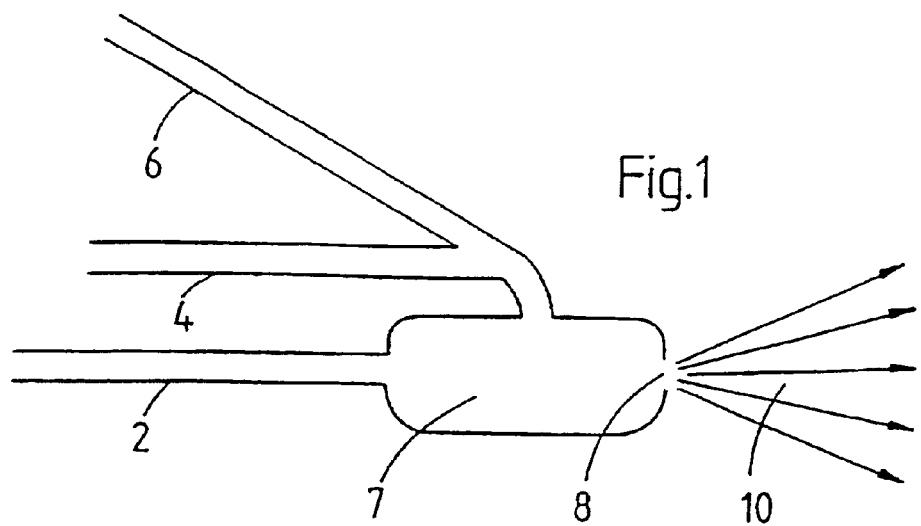

This application claims the benefit of No. 60/160,163, filed Oct. 19, 1999, and claims the benefit of No. 60/192,578 filed Mar. 28, 2000, and is a continuation of PCT/GB00/04016, filed Oct. 19, 2000.

FIELD OF THE INVENTION

This invention relates to materials suitable for use in coating surfaces in particular the surfaces of rock and to a method for the treatment of surfaces employing the materials of the invention.

BACKGROUND OF THE INVENTION

It has been previously proposed to apply a coating of a polymer for example a polyurethane or polyurea to a mine surface by spraying the polymer-forming reactants onto the surface to be coated.

Alternatively the rock surfaces in mines have been coated by spraying an aqueous emulsion of an organic polymer for example a polychloroprene and causing the polymer to coagulate to produce a flexible coating in the form of a film or skin on the surface. This technique has been described in South African Patent No 8203384.

More recently there has been described in WO 98/58886 a composition comprising two parts. One is an aqueous emulsion of an organic polymer such as the copolymer of ethylene and vinyl acetate. The other part is a cementitious composition capable of absorbing at least its own weight of water. The cementitious composition described is an ettringite-forming composition containing high alumina cement, ordinary Portland cement and anhydrite.

In use the two parts are sprayed onto a rock surface of a mine to form a coating. This patent also discloses a dry mixture of solids formed from the cementitious composition and a dried polymer emulsion to which mixture water is added in the mine. Japanese Patent Application No 60-158269 to Takeda Chem Ind Ltd and Ohbayashi Gumi KK describes a film-forming composition containing alumina cement, gypsum and an aqueous dispersion of a high molecular weight material which may be an organic polymer such as styrene butadiene rubber or ethylene vinyl acetate copolymer. The alumina cement comprises calcium aluminates such as $CaO.Al_2O_3$, $CaO.2Al_2O_3$, $12CaO.7Al_2O_3$ as the main components. The compositions are intended to be applied to form a film of several mm in thickness The specification discloses that compositions based on portland cement have been found to be brittle and crack easily because, it says, it is impossible to control the speed of film formation and the flexibility of the film. Alternatively, when compositions containing only alumina cement are used, because the cement is quick setting, the working life especially in the summer is too short even where a retarder is used. In addition the elastic modulus of the resulting film is too high which again means that it is brittle. The specification describes how by using a mixture of an alumina cement and gypsum it is possible to obtain films without defects which are not dependant on the temperature, humidity or water permeability of the substrate. There is no disclosure that by an appropriate selection of the proportions of C12A7, calcium sulphate and polymer a coating having both high early strength and good long term flexibility can be produced, nor is there any disclosure of compositions which inherently have this combination of properties.

PROBLEM TO BE SOLVED BY THE INVENTION

For use in a mine the coatings are required to have an adequate early strength, typically at least 135 psi and also to have adequate long term flexibility. Previously it has typically taken around 24 hours to achieve the adequate early strength. To reduce down time in the mine it is very desirable to reduce the time taken to reach the target figure for early strength. The present invention provides a solution to this problem by providing a composition containing a reactive cement having a C:A ratio of greater than 1:1 such as $C_{12}A_7$ and an organic polymer (which may be in the form of an emulsion or a dry powder), which composition on hydration is capable of achieving a strength at 4 hours of at least 135 psi and a long term flexibility, as measured by its elongation at 7 days of at least 20%.

SUMMARY OF THE INVENTION

According to the present invention there is provided a settable composition comprising (i) a cementitious composition comprising the following components:

(a) at least 25%, preferably at least 40% of a reactive cement having a C to A or (A+X) ratio of greater than 1:1, preferably greater than 1.2:1, (where X is S* or S or F) for example $C_{12}A_7$ or $C_3A$ or $C_4AF$ or an analogue of $C_{12}A_7$, (b) from 0 to 10% of lime and (c) from 5 to 70% preferably 10 to 40% of calcium sulphate, and where the sum of (b) and (c) is at least 15% the % being by weight based on the combined weight of (a), (b) and (c) and where the proportions of the components are such that the composition on hydration is capable of absorbing at least its own weight of water and (ii) an aqueous emulsion of an organic polymer, the amount of (ii) in relation to (i) being such as to provide a weight ratio of polymer solids to combined weight of (a), (b)) and (c) of from 0.5:1 to 10:1, preferably 0.7:1 to 2:1 or (iii) an organic polymer in the form of a powder dispersible in water and where the amount of organic polymer is such as to give a weight ratio of polymer solids to combined weight of (a), (b) and (c) of from 0.5:1 to 10:1, preferably 0.7:1 to 2:1 and where the proportions of the components are selected from within the above defined ranges to provide a composition which on hydration will have a tensile strength at 4 hours of at least 135 psi and an elongation at 7 days of at least 20%.

ADVANTAGEOUS EFFECT OF THE INVENTION

The advantage of employing the cement having a ratio of C:A of greater than 1:1 such as $C_{12}A_7$ is that it enables an adequate early strength to be achieved more quickly and at the same time provides good long term flexibility. Previous experience has been that when steps are taken to increase the early strength then flexibility is reduced ie the product becomes more brittle, and conversely, when steps are taken to increase the flexibility, the early strength is reduced. To achieve the defined combination of early strength and longer term flexibility was therefore surprising.

One of the uses of the composition is as a replacement for welded wire mesh and reducing the time to achieve early strength enables the support characteristics of welded wire mesh to be reached quicker.

DETAILED DESCRIPTION OF THE INVENTION

The cement having a ratio of C to A of greater than 1:1 is preferably $C_{12}A_7$ or $C_3A$ or an analogue of $C_{12}A_7$. $C_{12}A_7$ is known as the mineral Mayenite and, as its formula implies, is richer in lime than calcium monoaluminate which has the formula CA where C in cement notation represents CaO and A represents $Al_2O_3$. It is widely used in the steel industry where it is employed in the form of a clinker to form slag. It is normally present in high alumina cement as a minor component, where it is typically present at about 10% by weight. As a cement it is very reactive.

By an analogue of $C_{12}A_7$ is meant a material having a formula containing 7A the balance being C (where C is CaO) and other entities such as F or S (where S is silicate). Its analogues include $C_{11}A_7.CaF_2$ and $C_{11}A_7.CaS$. These analogues have a C:A ratio of at least 1.2:1. The calcium sulphate may be provided by a calcium sulphate-containing material such as beta-anhydrite, gypsum, or calcium sulphate hemihydrate.

The lime may be quick lime (CaO) or hydrated lime ($Ca(OH)_2$) or may be provided by ordinary Portland cement which releases lime on hydration.

Calcium sulphoaluminate has the formula $C_4A_3S^*$ where C is CaO, A is $Al_2O_3$ S is $SiO_2$ and $S^*$ is $SO_3$. This is sometimes known as Klein's compound and may also be written as $3CaO.3Al_2O_3.CaSO_4$ It is not essential that ettringite is formed, although it is preferred. To promote the formation of ettringite it is preferred to include calcium oxide and/or calcium hydroxide which may be provided by ordinary Portland cement to ensure that $3CaO.Al_2O_3$ is present in sufficient amount to form Ettringite during the hydration.

Ettringite is a calcium trisulphoaluminate having 32 molecules of water of crystallization and has the formula $3CaO.Al_2O_3.3CaSO_4.32H_2O$. Ettringite is produced by the hydration of cementitious materials containing calcium aluminate and calcium sulphate.

Unless the context requires otherwise, the term ettringite in the present specification is intended to include ettringite analogues. These are defined in Cement Chemistry by H. F. W. Taylor 2nd edition 1997 published by Thomas Telford. The preparation of ettringite-containing compositions is described in GB Patent No 2, 123, 808 which describes cement compositions that are capable of absorbing at least 2.5 parts by weight of water per part of solids and even as high as 5:1 without the free water separating out.

The formation of ettringite containing compositions is also described in European Patent No. 286396 which discloses its formation from mixtures containing high alumina cement and calcium sulphate where the addition of a water soluble fluoride causes the composition to set rapidly and develop high early strength even when the composition is mixed with water at a high water: solids weight ratio.

The term mine in the present specification is intended to include all underground workings including tunnels and quarries. For the avoidance of doubt the term reactive cement having a C to (A+X) ratio of greater than 1:1 does not include calcium sulphoaluminate.

In the specification S is $SiO_2$ and $S^*$ is $SO_3$. F is Fe2O3.

The invention has application in the construction industry for the treatment of buildings including internal and exterior walls, floors and ceilings.

When used for support in a mine, for example as a substitute for steel or plastic mesh, the product is a flexible coating on the rock surface. By flexible is meant the ability of the coating to deform and allow pieces of rock to move and retain the ability to take load.

The aqueous emulsion of organic polymer which is sometimes referred to in the art as a polymer latex emulsion may contain as the polymer one or more of a wide range of homopolymers or copolymers of ethylenically unsaturated monomers or naturally occurring polymers. Examples include styrene, styrene butadiene copolymers, divinyl styrene, methyl methacrylate, copolymers of styrene and methyl methacrylate or maleic anhydride, acrylic and acrylic ester resins, vinyl acetate and copolymers thereof with ethylene and other olefins (e.g. ethylene vinyl acetate), plasticised vinyl chloride copolymers. Suitable polymers are disclosed in U.S. Pat. No. 4,849,018 which are hereby incorporated by reference. Mixture of polymers or copolymers may be used.

It is preferred to employ a polymer with a glass transition temperature, written as Tg, of from $-50°$ to $50°$ C. more preferably from $-10°$ C. to $10°$ C.

Plasticisers such as Cereclor (a chlorinated paraffin), dibutyl phthalate and diethyleneglycol can be added to improve flexibility.

Suitable polymer solids contents of the emulsion are from 5 to 80%, preferably at least 25% eg from 30 to 70%, more preferably 45 to 65% by weight based on the weight of the emulsion. The dispersible organic polymer is conveniently obtained by drying eg spray drying an aqueous polymer emulsion. The dried polymers are available commercially.

According to another aspect of the present invention a method for coating a surface such as a rock surface comprises spraying onto the surface (a) a settable composition comprising the cementitious composition (i) and the aqueous emulsion of organic polymer (ii) as defined above or (b) a settable composition comprising the cementitious composition (i) and the dried polymer (iii) as defined above to which water has been added and continuing the spraying to form a coating on the surface at least 2 mm in thickness and allowing the coating to set.

When the organic polymer emulsion (ii) is used the water may be the water already present in the emulsion (ii) whereby the water of the aqueous emulsion is used to hydrate the cement components. If required or preferred additional water may be added. When the dried polymer emulsion (iii) is used with the cementitious composition (i) it is necessary to add the water required to hydrate the cement components.

Whether using the emulsion or the dried polymer emulsion the weight of water is preferably at least 50% by weight of the cementitious composition (i), more preferably at least 70% or 90%. Amounts of water greater than the weight of the cementitious composition (i) may be used for example, up to two, three or even five times. Cement accelerators or retarders may be added.

When it is desired to initiate or increase the rate of setting this can be effected by the addition of an alkali. When the mixture is being sprayed this addition can conveniently be done at or near the nozzle Addition of a strong alkali can give almost instantaneous setting.

Addition of a gelling agent such as a borate can accelerate the gelling of the polymer. The rate of gelling can be adjusted by selecting a borate of suitable solubility. For example, calcium borate is less soluble than zinc borate and gives a longer gelling and therefore working time.

The advantages of this are that the mixing batch equipment does not need to be cleaned out periodically e.g. after every 2 to 3 mixes.

The invention also provides a method of treating a rock surface in a mine which comprises spraying onto the surface a cementitious mixture and an organic polymer emulsion to form a film on the surface at least 2 mm in thickness.

The coating may be applied to provide support. It has been found that a coating of about 4 mm (e.g. about 3 to 7 mm) in thickness may be used as a replacement for wire mesh employed to prevent spalling and loose rock fragments from falling in a mine e.g. mesh referred to in the USA as No 7 mesh. The coatings may be used in mines which are known as "hard rock mines" such as nickel or gold mines and also in coal mines.

The coatings may be used for example when mining coal by the room and pillar method to reduce the size of the pillars which are left to provide support and thereby recover more coal. This is achieved by spraying the coating onto the pillar thereby increasing their load bearing ability. The coating may also be used to stabilise the ribs and for the repair and sealing of ventilation control structures.

The coatings may also be applied to reduce or prevent weathering, that is the erosion of freshly exposed rock surfaces by air in the mine, or for the suppression of radon gas in a uranium mine, or for stabilising embankments for example in a quarry, for stabilising roofs of tunnels or the like.

In WO 98/58886 the preferred cementitious composition is said to contain from 40 to 52% of ordinary Portland cement, 18 to 28% high alumina cement and from 27 to 31% by weight of anhydrite. According to one aspect of the present invention compositions of much lower ordinary Portland cement content for example less than 5% have been found to be advantageous.

By accelerating the formation of ettringite and other aluminate hydrates it has been found that the support characteristics of No 7 mesh can be obtained in less than 4 hours. By forming large amounts of ettringite and other aluminate hydrates it has been found that the coating passes the US ASTM (E162) and Underwriters Laboratory of Canada CAN ULC S102 fire tests without the need for a chemical fire retardant.

Figure 2:
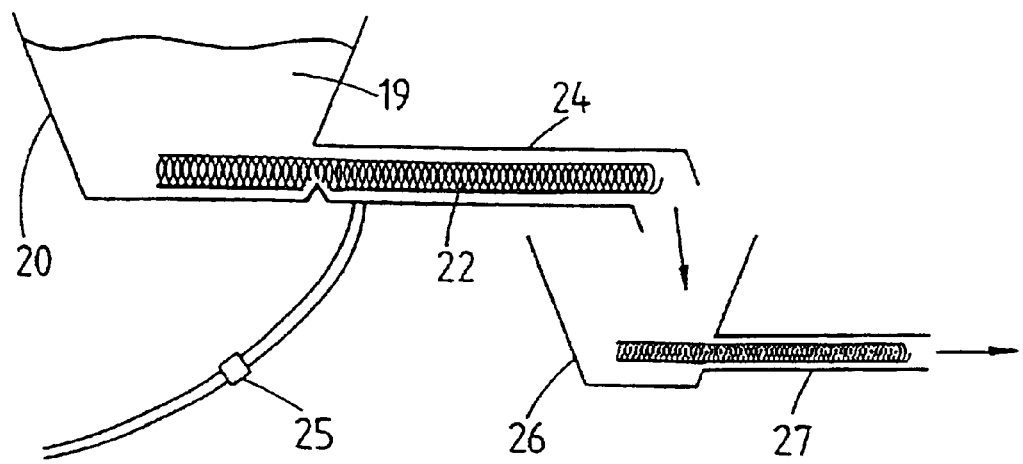

FIGS. 1 and 2 show the apparatus used in mixing and spraying to apply the coatings of the invention.

Referring to FIG. 1 three lines 2, 4 and 6 are connected to chamber 7 adjacent to a spray nozzle 8. Premixed emulsion/cement is supplied by line 2, air is supplied by line 4 where it is mixed with accelerator (if used) from line 6 before contacting the emulsion/cement mixture. A spray 10 comprising cement/emulsion, air and accelerator is emitted from the spray nozzle.

Referring to FIG. 2 dry powder 19 comprising cement and dried polymer emulsion is contained in hopper 20 from which it is withdrawn by a horizontal screw 22 into conduit 24. A controlled amount of water from a meter 25 is introduced into the conduit 24 and mixed with the powder by the action of the screw 22. From the conduit 24 the mixture is fed under gravity to a vessel 26 from which it is withdrawn by a Moyno pump 27 and then to a spray (not shown). The pump 27 is run faster than the mixture is fed to the vessel 26 so that the residence time in the vessel 26 is very short. Such an arrangement is known as a continuous placer.

The invention is described by the following Examples.

EXAMPLE 1

Preparation of Cementitious Composition

A cementitious composition was prepared containing the following:

| Component | parts by weight |
| --- | --- |
| *$C_{12}A_7$ | 59.44 |
| beta-anhydrite | 39.63 |

| Component | parts by weight |
| --- | --- |
| lithium carbonate | 0.4 |
| polysaccharide anti bleed agent** | 0.4 |
| citric acid | 0.13 |

\* Lafarge LDSF ground to cement fineness.

\*\* a water soluble polysaccharide biopolymer sold by Kelco International Ltd under the name Welan gum.

The above components which are all dry powders were mixed in a tumble blender.

Addition of emulsion and application to mine wall for formation of high early strength coating The above composition was mixed with a polymer emulsion in the form of Elvace 735 (an ethylene vinyl acetate emulsion obtained from Reichhold and containing 54.5% by weight of polymer solids with a glass transition temperature Tg of 0° C.) in the proportion of 2.5 parts by weight of emulsion to one of cement composition. This provided a ratio of 1.36 parts of polymer solids to 1 part of cementitious composition. The cementitious composition and the polymer emulsion were fed separately to a mixing vessel from where the mixture was drawn by a progressive cavity pump eg a Moyno pump and passed to the apparatus shown in FIG. 1. The mixture was sprayed onto a rock surface in a mine to form a film on the surface about 4 mm in thickness. The mixture had a working time of about 30 minutes and passed the CANMET strength test for a No. 7 mesh screen (2.2 tonnes of load) at 4 hours.

Compositions identical with the above except that the $C_{12}A_7$ was replaced with, in one case, ordinary portland cement (OPC) and in another case with high alumina cement.

The results were as follows:

HAC was too weak to demould at 4 hours so it was tested at 7 hours and found to have a strength of 70 psi an elongation of 0.77 inches and % elongation of 31%.

The OPC was found not to set.

$C_{12}A_7$ had a strength at 4 hours of 180 psi an elongation of 1.3 inches and a % elongation of 48%

At 7 days the $C_{12}A_7$ had a % elongation of greater than 20%.

Compositions (not according to the invention) were prepared in which the $C_{12}A_7$ was replaced with (i) calcium sulphoaluminate or (ii) HAC. Other relatively minor changes were also made to the composition the details of which are given below.

The calcium sulphoaluminate composition contained the following:

| | parts by weight % |
| --- | --- |
| calcium sulphoaluminate | 50 |
| anhydrite | 32.4 |
| ordinary portland cement | 16 |
| lithium carbonate | 0.3 |
| citric acid | 0.1 |
| polysaccharide | 0.6 |
| calcium hydroxide | 0.5 |
| nylon fibers* | 0.1 |
| total | 100 |

The HAC composition contained the following:

|  | parts by weight % |
|---|---|
| high alumina cement | 50 |
| anhydrite | 32.49 |
| ordinary portland cement | 16 |
| lithium carbonate | 0.1 |
| citric acid | 0.12 |
| polysaccharide | 0.69 |
| calcium hydroxide | 0.5 |
| nylon fibers* | 0.1 |
| total | 100% |

*sold under the Trade Name of Concfibers L.

One part of each of the calcium sulphaluminate and high alumina cement compositions was mixed with 2.5 parts by weight of Elvace 735 in the manner as described above for the $C_{12}A_7$ composition.

The results are summarised in Table 1.

TABLE 1

| cement | pot life | 4 hour strength (psi) | 8 hour strength (psi) | long term flexibility |
|---|---|---|---|---|
| HAC | long* | Low | 150 | good |
| CSA | short** | 135 | 170 | 12% |
| $C_{12}A_7$ | long*** | 180 | 230 | good+ |

*over 30 minutes
**20 to 25 minutes
***over 30 minutes
+by good is meant more than 20% elongation at 7 days.

From these results it is seen that only the $C_{12}A_7$ meets the tests for early strength at 4 hours and flexibility at 7 days.

EXAMPLE 2

For Comparative Purposes

A series of compositions were prepared to compare the performance of Ciment Fondu, ordinary Portland cement and $C_{12}A7$. The cements, in an amount to make up 100 parts by weight, were mixed separately with the following composition:

|  | parts by weight |
|---|---|
| lithium carbonate | 0.4 |
| calcium hydroxide | 0.25 |
| Welan gum | 0.8 |
| citric acid | 0.14. |

The resulting compositions were mixed with 2.5 parts by weight of Elvace 735 emulsion. The results are summarised in the following Table 2.

TABLE 2

|  | Ciment Fondu (50% CA) | OPC | C12A7 |
|---|---|---|---|
| 4 hour performance | 80/4.6/184% | not set | 120/>5.5/>220% |
| 8 hour performance | 120/>5.5/>220% | not set | 130/>5.5/>220% |
| 1 day performance | 230/2.4/96% | 60/>5.5/>220% | 180/3.1/124% |
| 2 day performance | 390/1.4/56% | 150/>5.5/>220% | 310/1.5/>60% |
| 7 day performance | 550/0.9/36% | 310/>5.5/>220% | 450/1.1/44% |

The data is listed as tensile strength in psi/elongation in inches/% elongation based on 2.5 inch starting length.

This data shows that:

(i) none of the three compositions met the requirement for a 135 psi strength at 4 hours although both the OPC and $C_{12}A_7$ containing compositions gave a good elongation at 24 hours (ii) the $C_{12}A_7$ composition without calcium sulphate did not meet the 13 psi early strength figure and was therefore unsatisfactory.

The Test Equipment and Procedures

Equipment required:

balance accurate to 0.1 grams, stopclock or clock with second hand, 8 ounce paper cups, thermometer, metal spatula, 1 quart plastic mixing container, Greaves mixer with blunted flat shear blades, Brookfield RVT viscometer with spindle No 6 5 gang tensile strength mould, mould release agent, plastic bag and Vertex 60 HVC testing machine.

Test procedure.

Room temperature should be between 60 and 90 degrees Fahrenheit. The Tensile strength test mould is prepared by coating the interior surfaces with a light film of mould release agent. The mould is assembled and securely fastened to the base plate. The set time sample cup is prepared by cutting an 8 ounce paper cup to a little over half its volume so that it can be used in the set time test.

400 grams of the liquid composition (polymer emulsion) are weighed out into the quart plastic mixing container. The batch number of the composition is recorded.

160 grams of powder composition (cementitious composition) are weighed out into an 8 ounce paper cup.

The mixing container with the liquid composition is placed under the mixing element of the Greaves mixer. The clock is started and immediately the powder composition is added to the mixing container and the speed of the mixer adjusted to ensure the materials are adequately mixed. The mixing container is moved in a circular motion to ensure uniform mixing and no lumps. The mixing is continued for 50 to 70 seconds.

At the end of the mixing the material is poured into an 8 ounce paper cup and levelled off with the top of the cup. The material in the cup is weighed and the weight of the cup deducted. The weight is recorded.

The material in the 8 ounce paper cup is tested for the cup weight test for viscosity between 2 and 5 minutes after mixing. A thermometer is inserted into the material and the temperature recorded. The thermometer is removed and Spindle No 6 inserted into the material so as not to trap air bubbles underneath the spindle. The sample is placed under the viscometer and the viscometer head lowered and the spindle attached. The head is adjusted with the sample cup so that the notch on the spindle is level with the surface of the material and centred. The speed is set at 5 rpm and the viscometer switched on (not using the helipath drive). The reading is taken when the pointer stabilizes at typically is to 30 seconds.

The reading multiplied by 2000 is the viscosity in centipoise.

The value is recorded.

The set time sample cup (prepared as described above) is filled with the material to a little below the top of the cup. The cup is set in the Humboldt Vicat penetrometer apparatus and the penetrometer adjusted so that the tip of its needle just touches the surface of the material. The penetrometer rod is locked.

The operator proceeds to the next step but completes the penetrometer test as follows: after 15 minutes has passed the indicator is set to zero and the penetrometer grasped with the left or right hand. The lock on the rod is released and the test commenced by immediately releasing the shaft of the penetrometer.

This test is repeated every 1 to 10 minutes as required and at different locations at least one quarter of an inch from any other test point until the penetration is less than 25 mm. This is recorded as the set time.

To determine the tensile strength 3 sections of the mould (prepared as earlier described) are filled so that the material is even with top of the mould and the mould tapped between 3 and 6 times on the table to further compact the material and eliminate any voids. If the mould requires additional material the tapping is repeated. The mould is marked with its batch number the type of product and sample date as well as the date for testing. The tensile strength samples are allowed to sit undisturbed for 1 day or 3 to 4 days as required. The difference in test times is to comply with production schedules. At the end of 1 day or 3 to 4 days the samples are carefully removed from the 5 gang tensile strength sample mould using care not to damage the samples and the tensile strength measured by recording the applied load at failure and dividing by the cross sectional area at the point of failure. Elongation was measured by a strain gauge or by the cross head movement of the tensile test machine.

What is claimed is:

1. A settable composition comprising
   (i) a cementitious composition comprising the following components:
      (a) at least 25% of a reactive cement having a CaO to $Al_2O_3$ or $(Al_2O_3+X)$ ratio of greater than 1:1, where X is $SO_3$, $SiO_2$ or $Fe_2O_3$;
      (b) from 0 to 10% of lime; and
      (c) from 5 to 70% of calcium sulphate, and where the sum of (b) and (c) is at least 15%,
      the % being by weight based on the combined weight of (a), (b) and (c) and where the proportions of the components are such that the composition on hydration is capable of absorbing at least its own weight of water; and
   (ii) an aqueous emulsion of an organic polymer, the amount of (ii) in relation to (i) being such as to provide a weight ratio of polymer solids to combined weight of (a), (b) and (c) of from 0.5:1 to 10:1; or
   (iii) an organic polymer in the form of a powder dispersible in water and where the amount of organic polymer is such as to give a weight ratio of polymer solids to combined weight of (a), (b) and (c) of from 0.5:1 to 10:1; and wherein
   the proportions of the components are selected from within the above defined ranges to provide a composition which on hydration will have a tensile strength at 4 hours of at least 135 psi and an elongation at 7 days of at least 20%.

2. A settable composition as claimed in claim 1 containing components (i) and (ii) and wherein the amount of water is equal to at least 50% by weight of the weight of the cementitious composition (i).

3. A settable composition as in claim 1, wherein the aqueous emulsion (ii) is present in amounts such that the amount of water is at least equal to 50% by weight of the cementitious composition (i).

4. A settable composition as in claim 3, wherein the aqueous emulsion (ii) is present in amounts such that the amount of water is 70 to 250% by weight of the cementitious composition (i).

5. A settable composition as in claim 2, wherein the amount of water is 70 to 250% by weight of the cementitious composition (i).

6. A settable composition as in claim 1, wherein the CaO to $Al_2O_3$ or $(Al_2O_3+X)$ ratio is greater than 1.2:1.

7. A settable composition as in claim 1, comprising 10 to 40% of said calcium sulphate (c).

8. A settable composition as in claim 1, comprising (i) and (ii), wherein the amount of (ii) in relation to (i) being such as to provide a weight ratio of polymer solids to combined weight of (a), (b) and (c) of from 0.7:1 to 2:1.

9. A settable composition as in claim 1, wherein the reactive cement (a) is present in an amount of at least 40%.

10. A settable composition as in claim 1, wherein the weight ratio of polymer solids to combined weight of (a), (b) and (c) is from 0.7:1 to 2:1.

11. A settable composition as in claim 10, wherein the CaO to $Al_2O_3$ or $(Al_2O_3+X)$ ratio is greater than 1.2:1.

12. A dry composition comprising:
   (1) a cementitious composition comprising the following components:
      (a) at least 25% of a reactive cement having a CaO to $Al_2O_3$ or $(Al_2O_3+X)$ ratio of greater than 1:1, where X is $SO_3$, $SiO_2$ or $Fe_2O_3$;
      (b) from 0 to 10% of lime; and
      (c) from 5 to 70% of calcium sulphate, and where the sum of (b) and (c) is at least 15%;
      the % being by weight based on the combined weight of (a), (b) and (c) and where the proportions of the components are such that the composition on hydration is capable of absorbing at least its own weight of water; and
   (2) an organic polymer in the form of a powder dispersible in water and where the amount of organic polymer is such as to give a weight ratio of polymer solids to combined weight of (a), (b) and (c) of from 0.5:1 to 10:1; and wherein
   the proportions of the components are selected from within the above defined ranges to provide a composition which on hydration will have a tensile strength at 4 hours of at least 135 psi and an elongation at 7 days of at least 20%; and
   (3) a gelling agent for the polymer.

13. A dry composition as claimed in claim 12, wherein the gelling agent is a borate.

14. A dry composition as in claim 12, wherein the CaO to $Al_2O_3$ or $(Al_2O_3+X)$ ratio is greater than 1.2:1.

15. A dry composition as in claim 12, comprising 10 to 40% of said calcium sulphate (c).

16. A dry composition as in claim 12, wherein the weight ratio of polymer solids to combined weight of (a), (b) and (c) is from 0.7:1 to 2:1.

17. A dry composition as in claim 12, wherein the reactive cement (a) is present in an amount of at least 40%.

* * * * *

UNITED STATES PATENT AND TRADEMARK OFFICE
CERTIFICATE OF CORRECTION

PATENT NO. : 6,780,237 B2  
APPLICATION NO. : 10/095097  
DATED : August 24, 2004  
INVENTOR(S) : Mills et al.

Page 1 of 1

It is certified that error appears in the above-identified patent and that said Letters Patent is hereby corrected as shown below:

On the title sheet:

The assignee information should be amended to read as follows:

(73) Assignee: Minova International Limited  
Oxfordshire (GB)

Signed and Sealed this

Fifth Day of June, 2007

JON W. DUDAS  
*Director of the United States Patent and Trademark Office*